United States Patent [19]

Hendrischk

[11] 4,152,962

[45] May 8, 1979

[54] CUTTING OF PAPER IN A PRINTER

[75] Inventor: Wolfgang Hendrischk, Neu-Ulm, Fed. Rep. of Germany

[73] Assignee: Mannesmann Aktiengesellschaft, Dusseldorf, Fed. Rep. of Germany

[21] Appl. No.: 858,202

[22] Filed: Dec. 7, 1977

[30] Foreign Application Priority Data

Dec. 7, 1977 [DE] Fed. Rep. of Germany ....... 2655832

[51] Int. Cl.[2] ......................... B26D 1/20; B23D 19/02

[52] U.S. Cl. ......................................... 83/482; 83/508; 83/614; 83/564; 83/485

[58] Field of Search ...................... 83/508, 508.2, 485, 83/486, 614, 489, 488, 564, 482

[56] References Cited

U.S. PATENT DOCUMENTS

| | | | |
|---|---|---|---|
| 2,624,408 | 1/1953 | Stein | 83/485 |
| 3,686,991 | 8/1972 | Fujimoto | 83/614 |
| 3,733,951 | 5/1973 | Fujimoto | 83/614 |
| 3,766,816 | 10/1973 | Loveless | 83/508 |
| 3,981,215 | 9/1976 | Granger et al. | 83/508 |
| 4,030,394 | 6/1977 | Kistner | 83/508 |

*Primary Examiner*—Donald R. Schran
*Attorney, Agent, or Firm*—Smyth, Pavitt, Siegemund, Jones & Martella

[57] ABSTRACT

A web is cut in a printer by a carriage driven stepped roll being urged against a stationary cutting edge so that a tear point travels ahead of the engagement of the roll with the edge and the paper. The roll can be retracted and latched into a non-cutting position.

13 Claims, 14 Drawing Figures

CUTTING OF PAPER IN A PRINTER

BACKGROUND OF THE INVENTION

The present invention relates to a device for cutting a web of paper in a printer.

Cutters of the type to which the invention pertains include, for example, a cutting bar having a right angle type cutting edge and being disposed on the transport path of the paper. The cutter may, in addition, include a cutting roll which rolls along the cutting edge. Other types of cutters are based on tearing along a line of perforations or the like or by employment of the shearing principle. Cutters of the latter types have been used for example in ticket printers in which the individual tickets are cut from a roll. A similar situation arises from the printout of account statements or the like. The cutting proper is carried out in these systems, for example by means of impact or rotating cutting blades or through a blade which moves on a carriage. Basically, all these cutting devices operate by shearing, whereby any part in the web being subjected to shearing is located in the intersection of two edges moving relative to each other. If one uses a device that tears along a perforation line the roll of paper has to be provided with such perforations prior to any cutting or tearing. Tearing without pre-perforating is practiced in so called shredders, using interdigitized rolls having stepwise differing larger and smaller dimensions. As the rolls wear, the cutting line deteriorates in quality which, considering the purpose of the device is an unimportant aspect.

A more specific problem can be defined as follows. In certain cases (printers), plural webs run next to each other, and just one is to be cut without cutting the others. If one intends to use impact cutters or rotating cutting blades, one needs one cutting blade per web or sheet. If the webs differ in width or if the same printer is to be used for printing on differently wide webs at different times, one has to exchange the blades accordingly. If one uses a cutter with a moving carriage for the blade, one will always have to cut all of the webs being located between the particular one to be cut and the left-hand or right-hand starting position of the cutter carriage. Alternatively, the webs which are not to be cut along the carriage travel path have to be retracted which complicates matters considerably.

DESCRIPTION OF THE INVENTION

It is an object of the present invention to provide a new and improved web cutter which avoids the deficiencies outlined above and which, if that is so desired, is readily adaptable to a type of printer in which a print head is driven by a carriage across the web.

It is a specific object of the invention to cut sheets or the like from a roll of paper in a serial printer.

In accordance with the preferred embodiment it is suggested to provide a stationary cutting edge established by the intersecting sides of a bar and cooperating with a carriage mounted roll having two different diameter portions and a shoulder in between. The roll is biased so that its small diameter portion is urged to roll on one of the sides, the web being in between, while the shoulder is urged against the other edge defining side so that the large diameter portion of the roll pushes the cut off portion of the web down.

As a consequence, the cutting operation is carried out by tearing rather than shearing but without requiring perforations. The cutter carriage may also carry the print head but does not have to. The roll is preferably mounted to retract from the cutting edge by means of a combined pivot and lateral displacement motion. Suitable latch means are provided to hold the roll in the non-cutting position, and suitable release means establish the transition whereby, preferably, there is always a transition from cutting to non-cutting operation at the end of cutting along a web, while continued cutting or commencement of cutting requires particular control intervention. Thus, the device has preferably three states. A cutting state in which the roll is urged and biased as stated; a temporary transition state of upward and lateral retraction which is always followed by a non-cutting state unless the latch is released; and the non-cutting state in which the roll is latched.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 shows a cutter roll 17 being constructed as a stepped roll having a large diameter portion 36, a small diameter portion 34 and an annular shoulder 35. Roll 17 is journalled on a shaft 33 which in turn is carried by a lever or pivot arm 22. The small diameter part 34 of roll 17 is on sheet or web 19, a freshly cut portion of which is in turn positioned on and along a cutting bar 18. A spring 26 exerts a force F2 upon arm 22, as is somewhat schematically indicated in FIG. 1, and that force is effective for urging part 34 of cutter roll 17 against the bar 18 thereby sandwiching the web 19 in between. The cutting edge 21 is defined by the paper bearing surface of bar 18 and a front face 53 of that bar intersecting at right angle. Reference numeral 20 refers to the web portion that has just been cut. A second spring 25 acts so that a force F3 urges shoulder 35 against front face 53 of bar 18. The bar 18 is fastened to a part 6 by means of bolts 32, which is part of the paper feeding and supporting structure in the printer. A pressure roll 16 urges the paper 19 against the top surface of part 6, exerting the force F1 against the paper.

FIG. 2 shows the parts of FIG. 1 on a smaller scale and in association with a matrix print head 1 and other parts of the printer. The print head 1 is connected to a carriage 2 which runs on transversely extending rails 3 and 4. Reference numeral 5 refers to a belt or the like which pulls the carriage 2 on the rails 3 and 4 across the width of the print area. The platen like element 6 is shown here in particular association with the print head 1; but it will be appreciated that platen extends over the entire width of desired printing. The platen element 6 has the additional function of carrying the cutter bar 18 as stated above. The bar 18 must extend at least over the width of the paper web.

Figure 2:
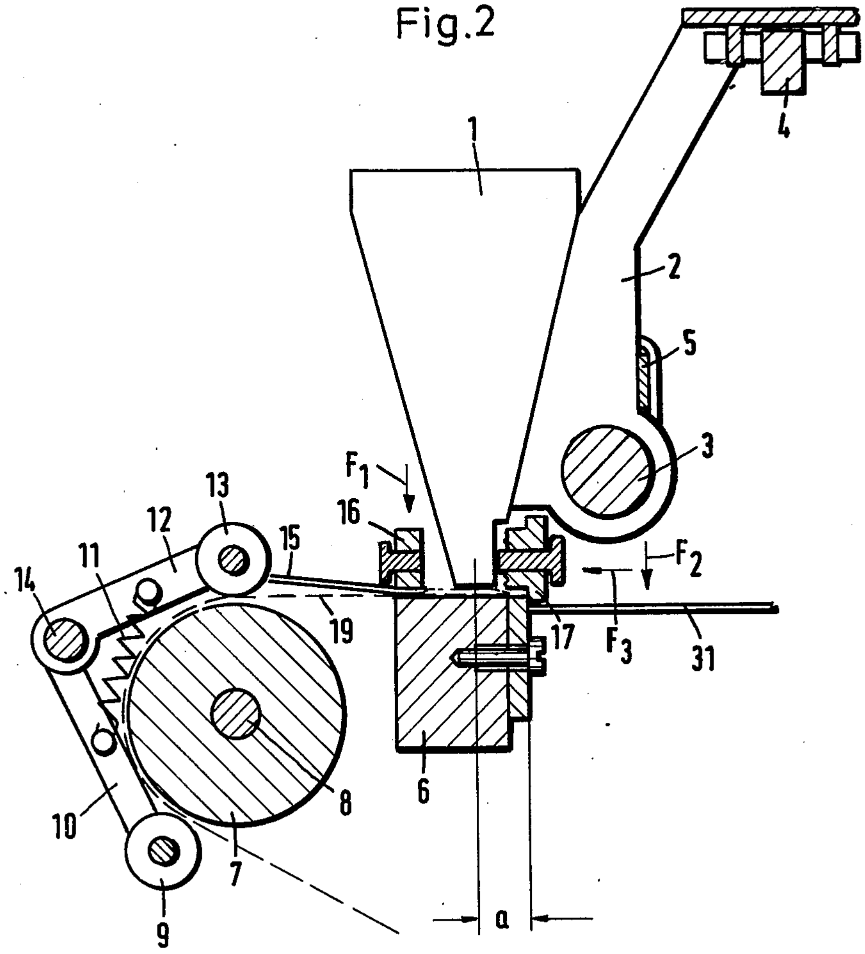
FIG. 2 is a schematic cross-section through a portion of a matrix printer showing particularly the association between print head and cutting device.

A friction roller 7 on a shaft 8 rotates stepwise for purposes of advancing the web 19 into printing position under head 1, for normal transport of the web to the right in FIG. 2. The transport is the result of frictional engagement between web 19 and roll 17. In lieu of a friction transport one could readily use sprocket wheels, rolls, belts, chains, etc. Use of a sprocket type transport obviates the need for the pressure parts 9 to 14 but requires other parts to ensure sprocket engagement as is known per se.

Considering the auxiliary components for the friction drive they include a pivot shaft 14 from which extend arms 10 and 12 which are biased by a spring 11 to urge pressure rolls 9 and 13 against different peripheral positions of friction roll 7, to thereby ensure frictional engagement of paper 19 with the roll 7. In addition, arm 12 carries a pressure sheet 15 of lower thickness and rather high resiliency. In the resting or normal state, the right end of sheet 15 (i.e. the side pointing away from the side along which the sheet 15 is connected to arm 12) is located a little above the web, for an unbiased sheet. Reference numeral 16 refers to the pressure roll which is carried by carriage 2 (the connecting lever arm has been omitted for the sake of clarity) to urge and bias the sheet 15 towards the web 19 whenever and wherever the carriage moves across the web. The cutting roll 17 is likewise movably disposed on the carriage. FIG. 2 depicts the roll 17 in cutting position, the shoulder 35 of the cutting roll extends below the support level of the paper by platen 6 and bar 18. Cutting proper results from shearing action as roll 17 rolls along bar 18 due to movement of the carriage 2 in a direction perpendicular to the plane of the drawings. FIG. 2 shows also the forces F2 and F3 by means of which the roll 17 is urged into the cutting position. The cut off sheet is caught by a tray, support or the like, identified by numeral 31.

It should be noted further that the parts 3,4,6,8 and 11 are in fact mounted in a common frame, and the drive means for the pulley, belt, chain, etc. 5 are also mounted to that frame. The same is true for the ink ribbon 55 as indicated by a dash-dot line in FIG. 2. Character a denotes the distance of the printhead center from the cutting edge.

Figure 3:
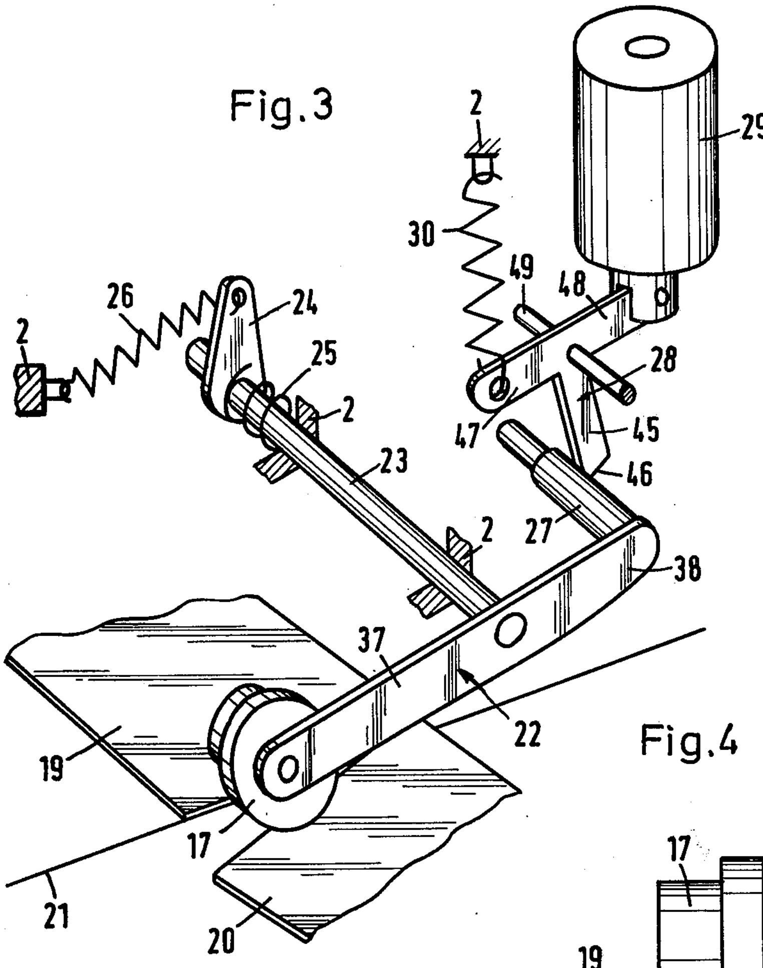
FIG. 3 is an isometric view of the position system for the cutting roll, shown in cutting position.

After having described the general association of the cutter parts with the printer, we turn to details of the position system for the cutter roll 17. FIG. 3 shows the cutter roll in lowered, cutting disposition. Roll 17 is journalled on one end of arm 37 of the pivot or rocking lever 22, having a pivot axis and shaft 23 which in turn carries a pivot arm 24. Parts 22,23 and 24 are secured to each other to pivot in unison. The other arm, 38, of pivot lever 22 carries a lock pin 27 which extends parallel to pivot shaft 23. Pin 27 has a smaller diameter end portion.

The pin 27 cooperates with a T-shaped latch 28 having two side arms 47 and 48 and a stem 45. A spring 30 is connected to arm 47 as well as to carriage 2. Arm 48 is operated solenoid 29 for pivoting latch 28 about the axis of a pivot shaft 49 against the force of spring 30. The spring 30 (for unenergized solenoid) urges the T-stem 45 against the large diameter position of pin 27. Reference numeral 46 denotes an oblique latch surface of stem 45.

Figure 1:
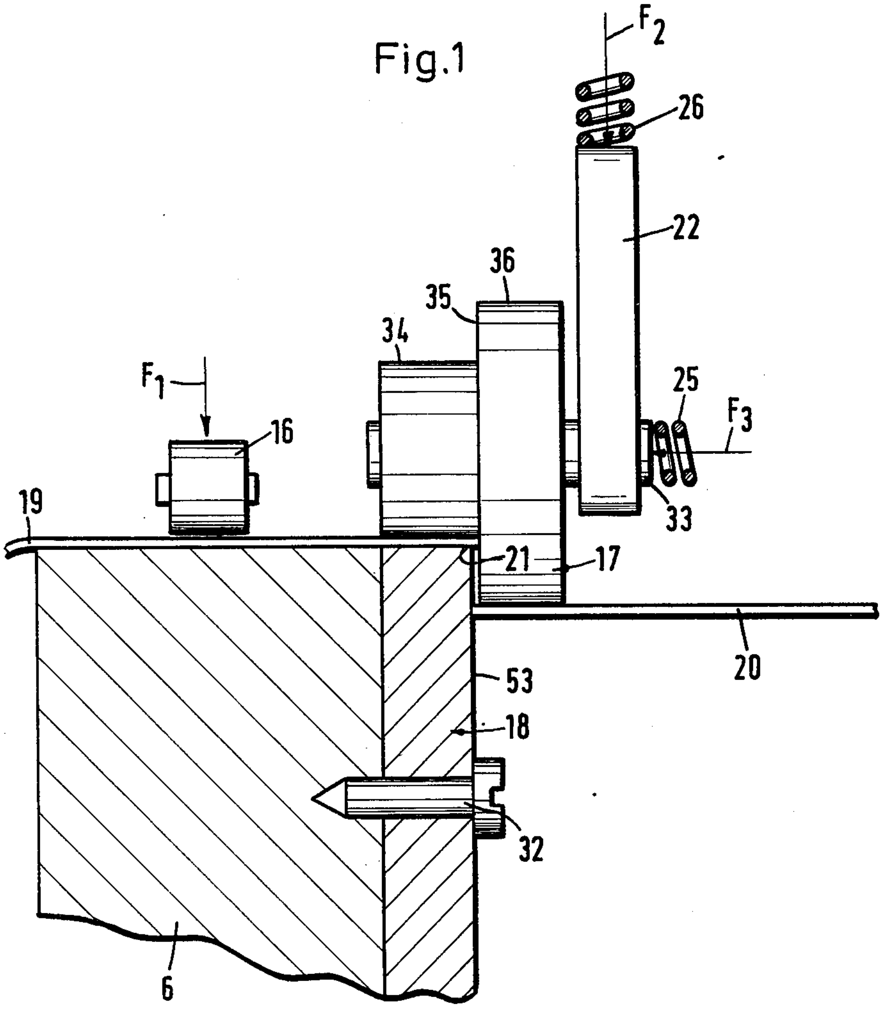
FIG. 1 illustrates a section view through a portion of the paper cutter in accordance with the preferred embodiment; showing particularly the cooperation of a cutting roll with a stationary cutting edge.

FIG. 3 (and others) show also the springs 25 and 26 which respectively provide the bias forces F3 and F2 for putting and holding the cutter roll 17 in the cutting position. The spring 26 acts on arm 24 to pivot the assembly 23, 24, 22 so that the roll 17 (or, more precisely portion 34 thereof) is urged onto bar 18, while spring 25 biases shaft 23 axially to pull the assembly 23,22 so that the shoulder 35 of large diameter portion 36 of the roll 17 is urged against the front face 53 of bar 18 (see FIG. 1).

Figure 4:
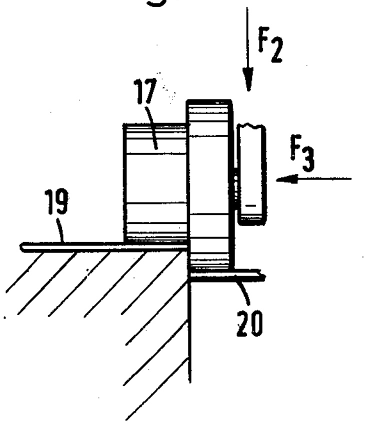
FIG. 4 is a front view of a detail of the device shown in FIG. 3.
Figure 5:
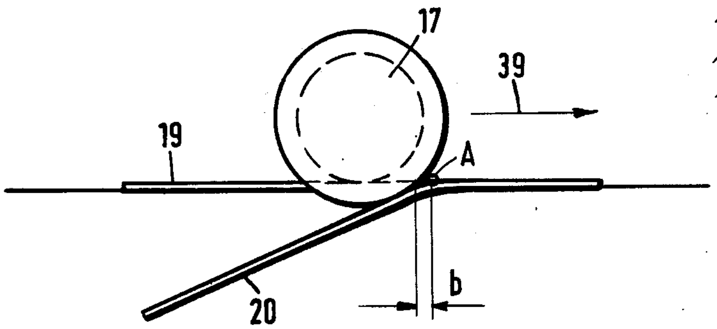
FIG. 5 is a side view of the detail of FIG. 4.

As stated, FIG. 3 shows the roll positioning mechanism in cutting position, solenoid 29 may be unenergized. FIG. 4 and 5 depict the cutting in greater detail. The point A in which the paper is actually cut by tearing is displaced by a distance b from the cutting point as established by the roll 17 and the edge 21, because the large diameter portion 36 of cutting roll 17 bends the cut off part 20 down, tearing rather than shearing the paper. Of course, some wear occurs upon sliding of roll 17 (at shoulder 35) along edge 21 but the cutting proper does not produce any wear. Tests have shown that the forces F2 and F3 do not have to be large; depending upon the strength of the paper these forces may be in range of 2 to 10 Newtons. These forces are quite small and, therefore, will little wear only on the parts 17 and 18. On the other hand, it has to be observed that the wear is in effect a regrinding of the cutter, particularly the rectangularity of the parts, such as the edge 21 and the groove between roll part 34 and shoulder 35, is continually refinished.

The machine is designed for low maintenance cost in that, for example, cutter roll 17 can easily be taken out and exchanged. The bar 18 is of symmetric construction so that all of its four long edges can be used as cutting edge. The bar is just unbolted and turned over and/or around. In order to avoid injuries and to provide for small dimensions, the roll 17 is small (ca. 10mm). The step, i.e. the ratio of the diameters of roll parts 34 and 36 may be about 1:1.1 to 1:1.6, depending upon the strength, thickness, etc. of the web.

Figure 6:
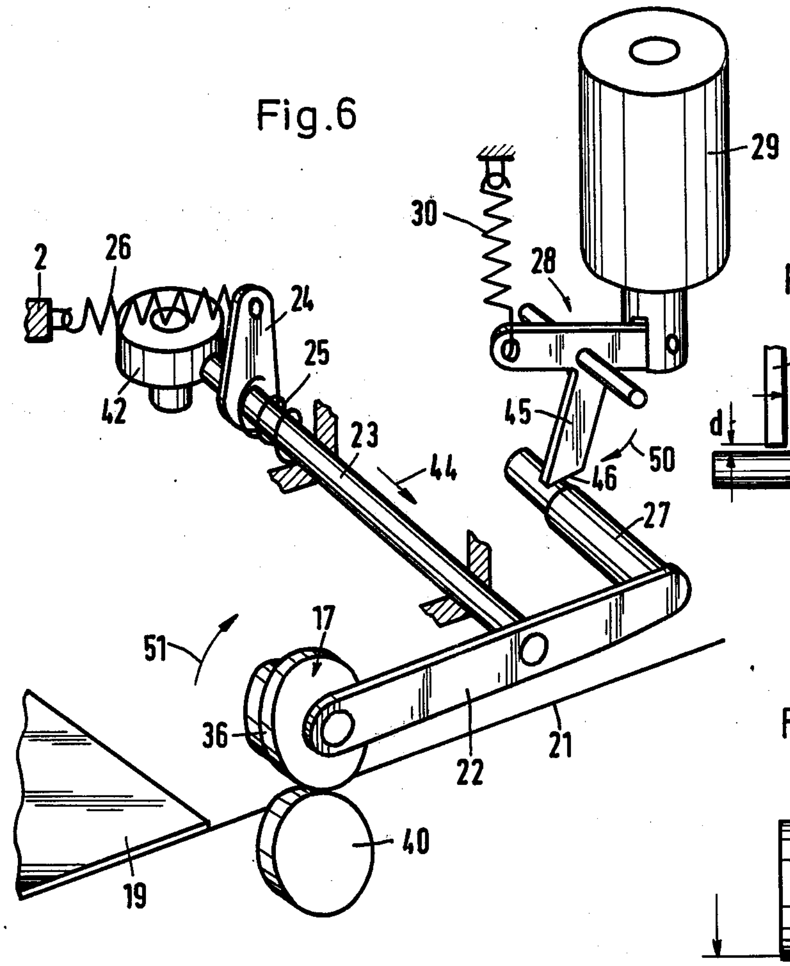
FIG. 6 is a view similar to FIG. 3 but showing the positioning system in a transitional state from the cutting state to a non-cutting state or vice versa.

FIG. 6 illustrates how the cutter mechanism can be deactivated, i.e. how the roll 17 can be retracted. Stops, guides, cams etc. denoted by 40 and 42 are provided for this purpose. These elements temporarily lift and retract the cutter roll 17 away from edge 21 during carriage movement. These cams, guides, stops etc. may be constructed in a variety of ways and shall fulfill the same purpose of lifting and retracting roll 17. It was found however that it is best to construct those elements 40 and 42 as rolls.

The cam element 42 urges shaft 23 in the direction of arrow 44 to move arm 22 and roll 17 away from the cutting edge, while roll 40 engages the larger diameter portion 36 of roll 17 to lift the roll by pivoting arm 22 (arrow 51).

Figure 7:
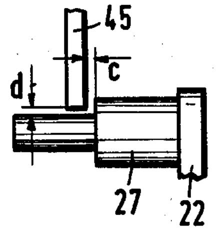
FIG. 7 is a side view of a detail of the system of FIG. 6.

Pin 27 is correspondingly displaced, but moves down so that latch arm 45 is moved by spring 30 over the pin to become located adjacent the step in pin 27 (see FIG. 7). Arrow 50 represents the more or less turning pivot motion of latch 28. The distance c and d in FIG. 27 represent essentially only clearances to be sufficiently large for permitting from movement of arm 45 into that position.

Figure 8:
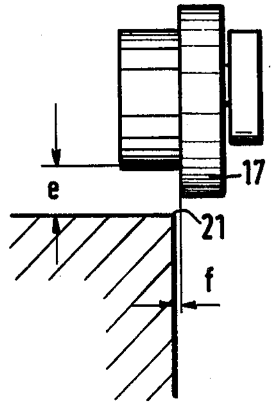
FIGS. 8 and 9 correspond to FIGS. 4 and 5, but refer to the operational state depicted in FIG. 6.
Figure 9:
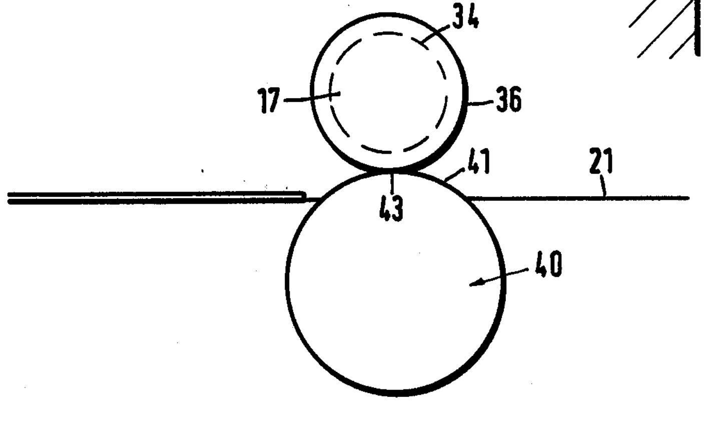

FIG. 8 depicts the highest and farthest lateral displacement position of the roll 17; the elevation e is established by the engagement of rolls 36,40 at the apex 43 (FIG. 9), and the distance f of shoulder 35 from the cutting edge results from a disposition in which the axis of shaft 23 is aligned with a radius of cam 42. The cam surface 41 of cam 40 may work elsewhere on roll 17 if that were desired. One could also use differently located cams which operate on different parts of the positioning system of the cutting roll, to move that roll out and away from the cutting position which, generally speaking, requires an up movement, well higher than the paper thickness, and at least a slight lateral retraction from the edge. It should be noted further that latch 28 can pivot in direction of arrow 50 only when solenoid 29 is not energized. The energisation of the solenoid causes the latch to be pivoted (or attempts to pivot it) in the direction opposite to arrow 50.

Figure 10:
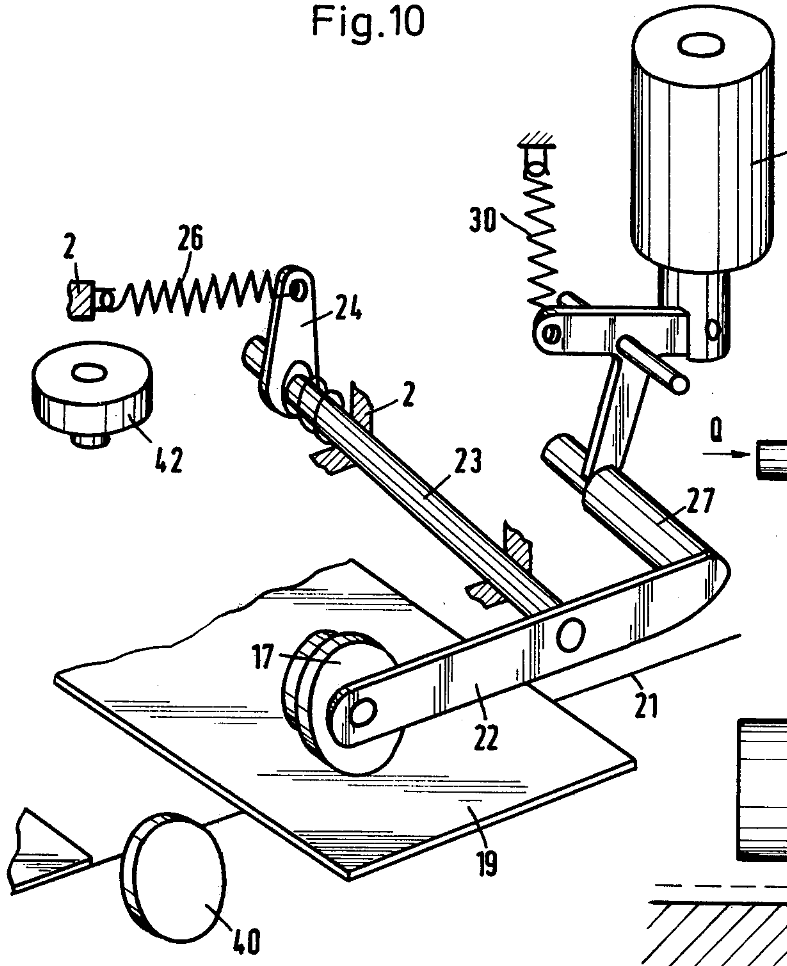
FIG. 10 is a view similar to FIGS. 3 and 6, but showing the positioning system in the non-cutting state.
Figure 12:
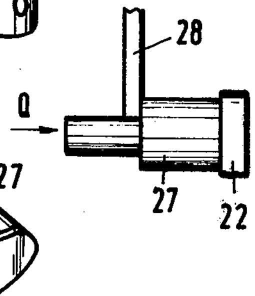
FIGS. 11, 12 and 14, respectively, correspond to FIGS. 8, 7 and 9, but in the non-cutting state.
Figure 11:
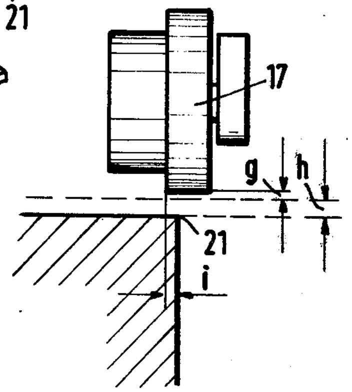
Figure 13:
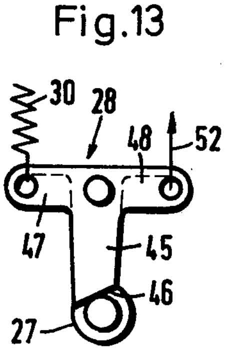
FIG. 13 shows another detail of FIG. 10.
Figure 14:
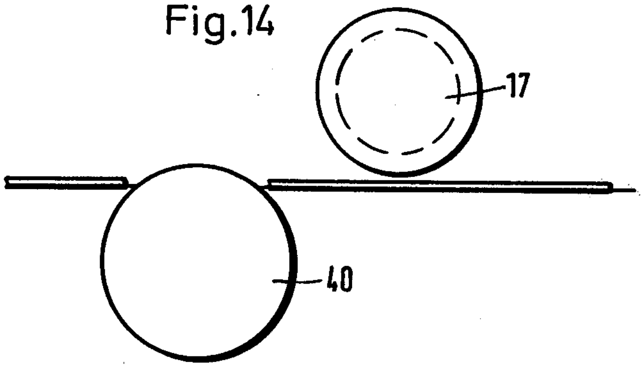

FIG. 10 shows the cutting roll positioning device in a lifted, non-cutting state and position. Latch arm 45 abuts against the shoulder of pin 27 (see FIG. 12) and prevents arm 22 from pivoting roll 17 in down direction, so that the cutting roll has a safe distance from the paper. The FIG. 10 shows the roll 17 on carriage 2 passing over a sheet 19 which, therefore, is not being cut. That distance g may even be small in relation to the paper thickness 10 (FIG. 11) because the latch positively inhibits the arm from bending down. The latch position is illustrated also in FIG. 13; the solenoid has been replaced by arrow 52.

The cutter operates as follows. The non-cutting state or position of the cutter is shown in FIG. 10. As the print head 1 (FIG. 2) prints, the roller 17 is lifted off (FIG. 11) so that the printed sheet is not being cut. Then the sheet is advanced, e.g. for printing the next line, roll 16 should not engage the paper. The various cam elements 40 and 42 are stationary so that the roll 17 whenever passing such a location, is lifted into the position as per FIG. 6 to 9. That, however, has no bearing on the fact that the roll 17 does not cut. The roll 17 is just displaced temporarily from a position of FIG. 11 to a position as shown in FIG. 8. The latch 28 is held by the spring 30 so that the relation between arm 45 and pin 27 shifts temporarily from the relation as per FIG. 12 to the relation as per FIG. 7, but at no time will the arm 22 be permitted to pivot the roll 17 into the cutting position.

If cutting is desired, the carriage must at first be placed into the operating range of a set of cams 40,42. Thus, such cams must be provided alongside the or each web 19. This apparatus is now controlled so that the solenoid 29 is energized when the positional relation of carriage, cams and positioning device is as shown in FIG. 6 to 9. If the solenoid is energized in that instant, latch 28 can be pivoted in direction opposite to arrow 50. As the carriage recedes from the cams 40,42 roll 17 is lowered to the sheet as well as urged against the cutting edge. The solenoid can be de-energized subsequently, but now arm 45 abuts the large diameter portion of the pin 27 and cannot lodge behind the step thereof. Roll 17 now cuts the paper as described. After having cut a sheet, carriage 2 may pass another set of cams 40,42 temporarily lifting the roll 17, but if the solenoid 29 is not energized, the positioning device is returned to the non-cutting state as per FIG. 10. If the solenoid 29 is energized, the next sheet will also be cut.

It can readily be seen that placement of cams 40,42 determines when and where one may want to cut. One set may suffice if one wants to cut in one direction only. Two sets, one on each end of the carriage travel path is needed if one wants to cut during either direction of carriage movement, but always over the entire width of that path. Whenever there are several sheets or webs along the travel path of the print head carriage, one needs one set for each gap between the sheets. It may be advisable to use two sets in a wide gap, one adjacent to each longitudinal edge of the two webs. Generally speaking, it is advisable to use and install as many sets of cams 40, 42 as there are forseeable instances in which one wishes to go from a cutting to a non-cutting state during travel, taking into consideration that the carriage travels both ways and that the cutter is capable of cutting in either direction of carriage travel.

Certain features act as safeguard. For example, the oblique direction of the edge 46 is instrumental in avoiding accidental disengagement of the latch. Solenoid 29 is weaker than the springs 25 and 26 as far as the effective force is concerned so that the solenoid cannot lift the latch when caught as per FIG. 12. This way one prevents accidental latch release whenever the carriage is not in the control range of a set of cams 40,42. Another safety feature results from the fact that shoulder 35 of cutter 17 is to the left of cutting edge 21 during the new cutting state (see FIG. 11). Should the latch 28 accidentally disengage, only the large diameter position 36 of roll 17 drops onto the paper on bar 18 and the roll will not cut. A suitable set of electric contacts may additionally supervise the system by responding always to a cutting position of roll 17 whether intended or otherwise. This, however, is an indirect type of supervision and depends on proper functioning of the supervising circuit. Therefore, it may be advisable to ensure proper cutting by letting the carriage run in cutting state in both directions, i.e. by causing each cutting operation to be performed twice. Of course, there should be no advance of the paper between the cuts.

The apparatus as described with reference to FIG. 2 to 14 must meet additional requirements, which explain certain aspects of the construction. The cutting system should have a small dimension which is the reason for placing cutting roll 17 centrally under head 1. A similar rule applies to roll 16. This in turn minimizes the travel range of carriage 2 (over and above the width of the paper). If dimensional constraints are less stringent, roll 17 may be placed alongside head 1.

As shown in FIG. 2, the distance a between print line and cutting edge may be or should be small, which accounts for the recess in head 1 to accomodate roll 17. If the roll 17 is placed side by side with the head that distance a can be made still smaller without requiring such a recess in head 1. Still alternatively, roll 17 may be placed in front of head 1, as seen in the direction of paper advance, i.e. to the left of the head in FIG. 2. The paper feed devices and the devices for catching the cut off sheets must be adapted accordingly.

The solenoid 29 is shown as being mounted on carriage 2. However, one may chose the following variations.

1. The solenoid or another alectromagnetic device is stationary with the frame of the printer, and its movement is transmitted upon the parts on the carriage through suitable linkage.

2. The magnet or solenoid is mounted on the carriage but moves the roll 17 directly; one does not need cams 40, 42 in that case.

3. The solenoid 29 is omitted entirely and one provides additional stops or the like which operate latch 28 via suitable linkage. The additional stops must be normally out of reach for the print range of the carriage so that they will not accidentally trigger a cutting operation.

The device as described operates with a pushing type paper advance. If for any reason a device for pulling the paper through the printer is needed, it may be better to use a separate carriage for the cutter running either in synchronism with the print head carriage or in the opposite direction. However, one may provide also for independent motion control and movement of these carriages. Seen in the direction of paper advance, the sequence of arrangement will be: print head carriage - paper pulling device - cutter carriage.

The invention is not limited to the embodiments described above but all changes and modifications thereof not constituting departures from the spirit and scope of the invention are intended to be included.

I claim:

1. Device for cutting a web in a printer, comprising:
- a stationary bar having two surfaces intersecting at right angles to establish a cutting edge extending transversely to a direction of web advance in the printer; one of the surfaces engaging the web to be cut;
- carriage means running along but above said bar;
- a cutting roll journalled on the carriage having first and second cylindrical portions respectively of small and large diameter and annular shoulder in between;
- means for urging the roll down towards the one surface of this bar so that the shoulder is located adjacent to the other one of the bar surfaces; and means for urging the shoulder laterally against the other bar surface.

2. Device as in claim 1, the large and small diameters of the roll having a ratio of 1:1.1 to 1:1.6.

3. Device as in claim 1, including means on the carriage for retracting the roll up and away from the bar

4. Device as in claim 3, including stationary means for operating the retracting means upon passing of the carriage.

5. Device as in claim 4, including means for latching the retracting means into a non-cutting position.

6. Device for cutting a web in a printer comprising: a stationary bar having a cutting edge, extending transversely to a direction of web advance in a printer;
- a carriage running along said bar;
- an axially displaceable pivot lever on the carriage;
- a stepped cutting roll journalled on the pivot lever;
- means for urging the stepped roll against the edge for cutting by tearing as the roll moves across the bar in rolling engagement therewith; and
- means for pivoting and axially displacing said lever to move the roll from a cutting position to non-cutting positions.

7. Device as in claim 6 and including latch means to hold the lever in a non-cutting position; and
- release means to permit the roller to return to a cutting position.

8. Device as in claim 6, the means for pivoting including cam means for temporarily displacing and pivoting the lever.

9. Device as in claim 8, the pivot lever having a latch pin, the device including latch means to engage the pin for holding the lever in a non-cutting position.

10. Device as in claim 8, there being a plurality of said cam means.

11. Device as in claim 11, the plural cam means being placed alongside different, parallelly positioned webs in the printer.

12. Device as in claim 6, said cutting edge being established by two surfaces intersecting at right angles.

13. Device as in claim 12, said means for urging, including a first spring, acting on the lever and pivot the lever down and a second spring acting transversely thereto so that the roll is urged against the two surfaces.

* * * * *